United States Patent
Andrew et al.

(10) Patent No.: US 10,713,286 B2
(45) Date of Patent: Jul. 14, 2020

(54) STORAGE OF POINT OF INTEREST DATA ON A USER DEVICE FOR OFFLINE USE

(71) Applicant: MICROSOFT TECHNOLOGY LICENSING, LLC, Redmond, WA (US)

(72) Inventors: Felix Gerard Torquil Ifor Andrew, Seattle, WA (US); Silvana Patricia Moncayo, Seattle, WA (US); Oliver Bruno Colbert, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 412 days.

(21) Appl. No.: 15/634,519

(22) Filed: Jun. 27, 2017

(65) Prior Publication Data

US 2018/0373733 A1 Dec. 27, 2018

(51) Int. Cl.
| | | |
|---|---|---|
| *G06F 16/00* | (2019.01) | |
| *G06F 16/29* | (2019.01) | |
| *H04L 29/08* | (2006.01) | |
| *G06Q 50/12* | (2012.01) | |
| *G06F 16/9535* | (2019.01) | |
| *G06F 16/44* | (2019.01) | |

(52) U.S. Cl.
CPC ............ *G06F 16/29* (2019.01); *G06F 16/444* (2019.01); *G06F 16/9535* (2019.01); *G06Q 50/12* (2013.01); *H04L 67/18* (2013.01); *H04L 67/306* (2013.01)

(58) Field of Classification Search
CPC .... G06F 16/1737; G06F 16/172; G06F 16/29; G06F 16/444; G06F 16/9535
See application file for complete search history.

(56) References Cited

U.S. PATENT DOCUMENTS

| | | | |
|---|---|---|---|
| 7,778,987 B2 | 8/2010 | Hawkins | |
| 8,239,130 B1* | 8/2012 | Upstill | G01C 21/3679 |
| | | | 701/400 |
| 9,361,395 B2 | 6/2016 | Barrett-Kahn et al. | |
| 2007/0033569 A1 | 2/2007 | Davidson et al. | |
| 2008/0086540 A1 | 4/2008 | Scott et al. | |
| 2008/0147671 A1 | 6/2008 | Simon et al. | |

(Continued)

FOREIGN PATENT DOCUMENTS

| | | |
|---|---|---|
| EP | 2533157 A3 | 3/2013 |
| EP | 2958033 A1 | 12/2015 |
| WO | 2015187895 A1 | 12/2015 |

OTHER PUBLICATIONS

"International Search Report and Written Opinion Issued in PCT Application No. PCT/US2018/033763", dated Nov. 6, 2018, 15 Pages.

(Continued)

*Primary Examiner* — Thu Nguyet T Le

(74) *Attorney, Agent, or Firm* — Shook, Hardy & Bacon, LLP

(57) ABSTRACT

The technology described herein optimally allocates the limited computer storage on the end user device to point of interest data most likely to be used by a map application. The offline point of interest data can include first-tier, second-tier, and third-tier data about different points. The offline data can be selected based on overall usage among all people and also specially tailored for individual users interests.

20 Claims, 8 Drawing Sheets

(56) References Cited

U.S. PATENT DOCUMENTS

| | | |
|---|---|---|
| 2009/0228545 A1 | 9/2009 | Mendez et al. |
| 2009/0248695 A1 | 10/2009 | Ozzie et al. |
| 2013/0060885 A1 | 3/2013 | Fu |
| 2013/0321466 A1* | 12/2013 | Kocienda ............... G01C 21/26 345/635 |
| 2014/0129666 A1 | 5/2014 | Cox et al. |
| 2014/0274107 A1* | 9/2014 | Rados ................ G01C 21/3617 455/456.1 |
| 2015/0370811 A1* | 12/2015 | Ding ................... G06F 16/9537 707/724 |
| 2016/0021209 A1 | 1/2016 | Lacasse et al. |
| 2016/0349063 A1* | 12/2016 | Maurer ............ G08G 1/096833 |

OTHER PUBLICATIONS

Li, Huirong, "iTunes: Offline Maps—for Google Maps Edition with Directions and Offline POI Search", https://itunes.apple.com/in/app/offline-maps-for-google-maps/id903247390?mt=8, Published on: Jan. 20, 2016, 2 pages.

* cited by examiner

STORAGE OF POINT OF INTEREST DATA ON A USER DEVICE FOR OFFLINE USE

BACKGROUND

Currently, users have limited access to point of interest data when using a map or navigation application offline. Modern map applications provide navigation assistance and query response using a combination of online and offline data. Map applications may store geographic data on a client device that enables the map application to provide directions while disconnected from an external data source, such as an online service. When online, the map applications may retrieve point of interest data from a service and show points of interest along the route, nearby a current location, or as requested, for example, in response to a query. Little or no point of interest data may be available offline.

The geographic data stored on a user device may include very little information about points of interest on a map, such as restaurants, movie theaters, schools, hospitals, entertainment venues, etc. When point of interest data is available to an offline map application, the data is often very limited in terms of the information provided about the various points of interest and the number of points of interest included in the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein optimally allocates the limited computer storage on the user device to point of interest data most likely to be used by a map application. The offline point of interest data can include first-tier, second-tier, and third-tier data about different points. The first-tier point of interest data includes information required to display a point of interest on a map provided on a graphical user interface by the map application. The second-tier point of interest data includes information about the entity that is used to generate a search result for the point of interest. The second-tier information is provided by an entity associated with the point of interest. For example, the information can be found on a web page provided by the entity. The third-tier information includes information about the point of interest provided by a third party. For example, an aggregate rating and/or reviews for the point of interest provided by a third-party website or application.

In an aspect, the point of interest information is limited by geography. The geography can correspond to the geography of the offline map data. The offline map data can be limited based on a user's geographic profile. For example, offline map data may be stored for only the geographic area in which the user lives, such as a state or metropolitan area. Offline map data may also be provided for places a user frequently travels to for work or other reasons. Aspects of the technology described herein may retrieve first-tier information for only points of interest having a geographic location within the offline map data stored on a user device.

Point of interest data can be tailored to a user's interests. A user's interest can be determined by analyzing contextual signal data, including event data for a user. The signal information is analyzed to detect patterns that correspond to a user interest. For example, a user that frequently visits fish restaurants may be categorized as having an interest in fish restaurants. The point of interest usage data for people similarly categorized as having interest in fish restaurants may be analyzed to determine points of interest visited by people having an interest in fish restaurants and then included in the offline data package provided to each user device associated with people having an interest in fish restaurants. As can be imagined, points of interest for people who like fish restaurants could include fish restaurants, fish markets, sushi restaurants, and other points of interest that may be less intuitively connected to an interest in fish restaurants.

The allocation of offline point of interest data to first-tier, second-tier, and third-tier information can be based on usage data for a particular person. In an extreme example, a user that never accesses second-tier or third-tier information may not be provided any second or third-tier information. More generally, more of the available offline storage will be allocated to second-tier information and third-tier information as usage of the second-tier and third-tier information increases for a particular user. The allocation of available storage to different tiers of information can be based on a combination of usage data for a particular user and usage data for similar users. Here, similar users are those with similar contextual characteristics. The contextual characteristics can include demographic characteristics and interest characteristics. Alternatively, the allocation can be based solely on usage data for a particular user or usage data for similar users.

The first-tier, second-tier, and third-tier information can also be based on overall usage within the geographic area by all users. In this case, usage means accessing or interacting with a point of interest data within search results for navigation/map application. The more frequently a point of interest is accessed by a plurality of users, the more likely it is to be included in the offline point of interest data for all users.

In one aspect, general first-tier information is provided for storage on a user device. The general first-tier information can comprise all points of interest having above a low threshold of overall interaction without regard to a particular user's interests. The general first-tier information can be supplemented with user-specific first-tier information for points of interest that match a specific user profile. Accordingly, the first-tier information stored on a particular user device includes both the general information and user-specific information.

In one aspect, general second-tier information is provided for storage on a user device. The general second-tier information can comprise supplemental information for all points of interest having above a medium threshold of overall interaction without regard to a particular user's interests. The medium threshold is greater than the low threshold used to determine inclusion in the first-tier information. The general second-tier information can be supplemented with user-specific second-tier information for points of interest that match a specific user profile. Accordingly, the total second-tier information on a particular user device can include both the general information and user-specific information.

In one aspect, general third-tier information is provided for storage on a user device. The general third-tier information can comprise all points of interest having above a high threshold of overall interaction without regard to a particular user's interests. The high threshold is greater than the medium threshold used to determine inclusion in the second-tier information and the low threshold used to determine inclusion in the first-tier information. The general third-tier information can be supplemented with third-tier information for points of interest that match a specific user profile. Accordingly, the third-tier information for a particular user can include both the general information and user-specific information.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
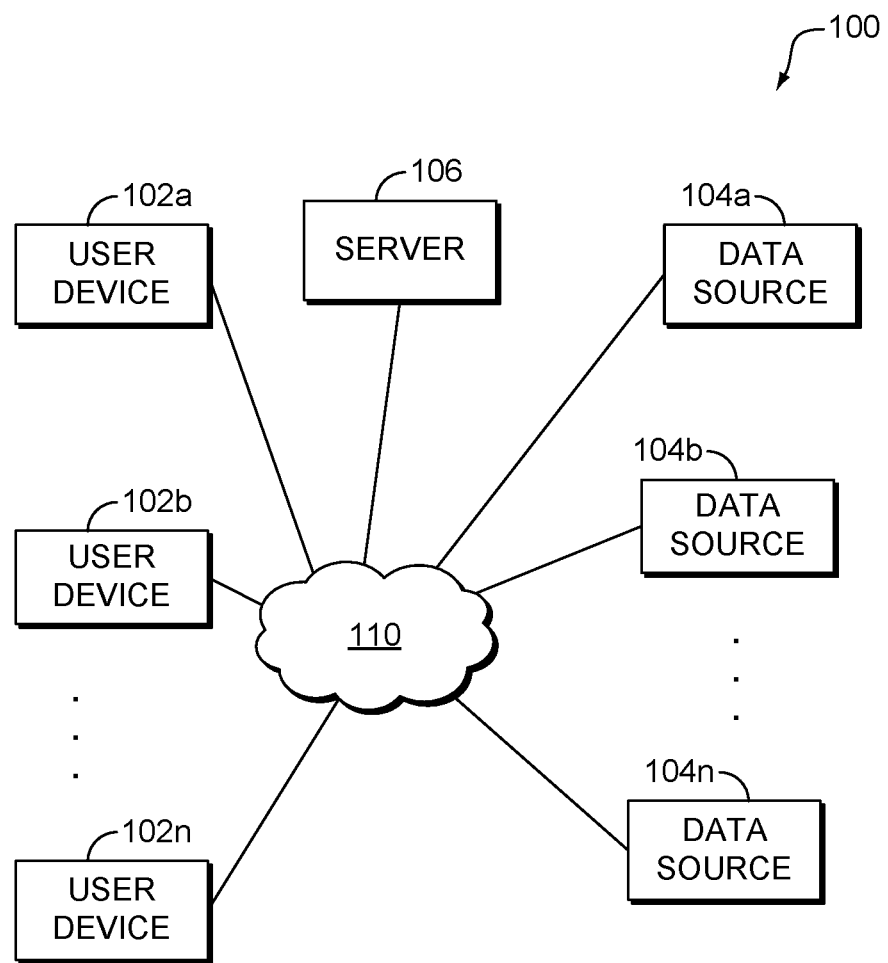
FIG. 1 is a block diagram of an example operating environment suitable for implementations of the present disclosure.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology optimally allocates the limited computer storage on the end user device to point of interest data most likely to be used by a map application. A map application is any application that generates an interface that displays a road map. As used herein, the map application is installed on a user device, such as a smartphone. Because it is installed on the user device, the map application can provide map functionality when the user device is not connected to a network (i.e., offline). The map applications described herein may provide different levels of functionality when online (i.e., connected to a network) or offline. For example, when online, the map application may be able to describe all available points of interest and provide road data for a wider geographic area. As used herein, the map application can provide both road data and point of interest data for points located on a map when offline.

Different types of map applications exist. For example, some map applications can help a user navigate between two points and may show points of interest along the route, such as restaurants and gas stations. Some map applications use maps in limited circumstances. For example, a search function may show search results on a map in only some contexts.

The map application uses road map data and point of interest data stored on the user device to generate a map interface when the user device is offline. The map data stored on the end user device is described herein as "device road map data" and "device point of interest data." The device road map data and the device point of interest data are in contrast to "remote road map data" and "remote point of interest data" that may be available from a service the map application can access when online. The technology described herein optimizes the device point of interest data.

The device point of interest data can include first-tier, second-tier, and third-tier data about different points. The first-tier point of interest data includes information required to display a point of interest on a map by the map application. The first-tier data can include identification information for the point of interest, such as a name of a business. The first-tier data can also include location information for the point of interest. Location information can include longitude and latitude information that is used to accurately display a point of interest on a map. The location information can also include an address that is displayable to the user and can help the user find the location in the real world.

The first-tier information can also include information used to generate a search result for the point of interest. The search result information can include classification information that is used to determine when the point of interest is relevant to a query. The classification scheme can include multiple levels. For example, a restaurant may be classified as a restaurant, and then by food type, by price, and by other factors. The search result information in the first-tier data can also include a snippet about the point of interest that can be used to generate a search result describing the point of interest to the user.

The second-tier point of interest information includes information provided by selecting a point of interest on a map or a search result for the point of interest. The second-tier information is provided by an entity associated with the point of interest. For example, on a web page provided by the entity. Note that a single entity can be associated with multiple points of interest. For example, a corporation is an entity that may have multiple stores, where each store is an individual point of interest. In one aspect, the second-tier information includes a copy of a homepage for the point of interest. The second-tier information could also include hours of operation, daily specials, a menu, movie showings and associated start times, and other information.

The third-tier information includes information about the point of interest provided by a third party. For example, an aggregate rating and/or written reviews for the point of interest provided by a third-party website or application.

The first-tier, second-tier, and third-tier information can be optimized using the same criteria or different criteria. In other words, the same methodology or criteria can be used to select the first-tier information and the second-tier information. Alternatively, a different methodology could be used to optimize the first-tier information and the second-tier information. Generally, first-tier information for more points of interest may be included in the offline data than corresponding second-tier and third-tier information. Accordingly, some points of interest may only have first-tier information, while others have first and second-tier information, and still others have first, second, and third-tier information.

In an aspect, the first-tier information is limited by geography. The geography can correspond to the geography of the offline map data. The offline map data can be limited based on a user's geographic profile. For example, offline map data may be stored for only the geographic area in which the user lives, such as a state or metropolitan area. Offline map data may also be provided for places a user frequently travels to for work or other reasons. Aspects of the technology described herein may retrieve first-tier information for only points of interest having a geographic location within the offline map data stored on a user device.

In many cases, the offline map data can cover a large area, such as several states. Accordingly, it may not be possible to store first-tier information for every point of interest within the geographic area associated with a particular user, let alone second-tier information or third-tier information. Instead, aspects of the technology described herein assign a probability of use to various first-tier information, second-tier information, and third-tier information. The probability of use can be calculated for a specific user based on characteristics of the user, such as user interests, restaurant preferences, and other information. User characteristics can also include geographic profile information. In one aspect, a higher proportion of points of interest nearby a user's high occurrence geographic footprint may be included in the offline data than points of interests outside of a user's high occurrence geographic footprint. The high occurrence geographic footprint can be formed by analyzing location information gathered from a user's devices. As an example, a high occurrence geographic footprint can include a user's home, place of work, and route taken between the user's home and place of work. Other frequently visited locations, such as a gym, entertainment district, or other area, can be located within the user's high occurrence geographic footprint.

A user's interest can be determined by analyzing contextual signal data, including event data for a user. The signal information is analyzed to detect patterns that correspond to a user interest. For example, a user that frequently visits fish restaurants may be categorized as having an interest in fish restaurants. The point of interest usage data for people similarly categorized as having interest in fish restaurants may be analyzed to determine points of interest visited by people having an interest in fish restaurants and then included in the offline data package provided to each user device associated with the user of people having an interest in fish restaurants. As can be imagined, points of interest for people who like fish restaurants could include fish restaurants, fish markets, sushi restaurants, and other points of interest that may be less intuitively connected to an interest in fish restaurants.

A person may be classified into multiple interests. A point of interest data package may be provided for each interest. The data packages need not be separate and distinct packages; instead, points of interests associated with an interest may be added to a master list for a particular user. In this way, a point of interest only shows up a single time in an individual user's master list even if the point of interest is included in multiple user-interest categories.

The allocation of offline point of interest data to first-tier, second-tier, and third-tier information can be based on usage data for a particular person. In an extreme example, a user that never accesses second-tier or third-tier information may not be provided any second or third-tier information. More generally, more of the available offline storage will be allocated to second-tier information and third-year information as usage of the second-tier and third-tier information increases. The allocation of available storage to different tiers of information can be based on a combination of usage data for a particular user and usage data for similar users. Here, similar users are those with similar contextual characteristics as the user. The contextual characteristics can include demographic characteristics and interest characteristics. Alternatively, the allocation can be based solely on usage data for a particular user or usage data for similar users.

The first-tier, second-tier, and third-tier information can also be based on overall usage within the geographic area by all users. In this case, usage means accessing or interacting with a point of interest data within search results for a navigation/map application. The more frequently a point of interest is accessed by a plurality of users, the more likely it is to be included in the offline point of interest data.

Characteristics of different points of interest can be learned by studying the visitation patterns. For example, restaurants frequently visited by users with a known interest in vegetarian food could be classified as a vegetarian restaurant or, at least, acceptable to a vegetarian. In this way, the characteristics of various points of interest can be learned by studying the characteristics of users that frequent the points of interest. The classification for a particular point of interest does not need to be specifically delineated. Instead, the point of interest can be listed as more appealing to users having one or more different interests. For example, users that frequently visit a first restaurant may be statistically more likely to visit a second restaurant than they are likely to visit any random restaurant selected from the geographic area, though the relationship between the first and second restaurant may remain unknown. When a user is observed visiting the first restaurant, then point of interest information for the second restaurant may be added to their offline data.

As another example, hours of operation, or at least estimated hours of operation, for a point of interest could also be learned by studying visitation patterns. Time periods associated with no visitation events can be classified as not within the hours of operation for the point of interest. As used herein, visitation can mean a real or virtual visitation with the point of interest. For example, a user's device being co-located at the point of interest based on geographic data collected from the device can constitute a real visitation. Similarly, visiting a website associated with a point of interest can constitute a virtual visitation. Different types of virtual visitations could be given different types of weight when calculating a frequency of visitation. For example, selection of a point of interest on a map can be given more weight than visiting a website associated with a point of interest when calculating virtual visitation frequency.

In one aspect, general first-tier information is provided for storage on a user device. The general first-tier information can comprise all points of interest having above a low threshold of overall interaction without regard to a particular user's interests. The general first-tier information can be supplemented with user-specific first-tier information for points of interest that match a specific user profile. Accordingly, the first-tier information stored on a particular user device can include both the general information and user-specific information.

In one aspect, general second-tier information is provided for storage on a user device. The general second-tier information can comprise supplemental information for all points of interest having above a medium threshold of overall interaction without regard to a particular user's interests. The medium threshold is different from the low threshold used to determine inclusion in the first-tier information. The general second-tier information can be supplemented with user-specific second-tier information for points of interest that match a specific user profile. Accordingly, the total second-tier information on a particular user device can include both the general information and user-specific information.

In one aspect, general third-tier information is provided for storage on a user device. The general third-tier information can comprise all points of interest having above a high threshold of overall interaction without regard to a particular user's interests. The high threshold is different from the medium threshold used to determine inclusion in the second-tier information and the low threshold used to determine inclusion in the first-tier information. The general third-tier information can be supplemented with third-tier information for points of interest that match a specific user profile. Accordingly, the third-tier information for a particular user can include both the general information and user-specific information.

As used herein, "offline" means that an application on a user device does not have access to a data set or service located on a different computing system, such as a data center. The lack of access can be caused by the lack of a wired or wireless network connection between the user device and the different computing system. The lack of access can also be caused by data settings or other settings (e.g., low power mode) on the end user device. For example, the application may not have permission to use a data connection, even though the user device is connected to a network with a data connection. Network limitations can also cause a lack of access. For example, the network may limit data because of usage limits or other policies.

The events related to point of interest usage can be detected from a variety of signals received from computing devices, such as wearables, personal computers, smartphones, tablets, e-readers, augmented reality glasses, virtual reality glasses, and such. The relevant signals collected by these devices can include user browsing history, query data, GPS and other location data, travel times, application usage, phone records, messaging records, and similar. The various contextual signals can be combined to determine event data. Event data can include exercise events, eating events, work events, transit events, social events, entertainment events, browsing events, shopping events, and other events related to point of interest usage.

In one aspect, eating events are used as a constituent of the point of interest usage data. Eating events can be detected using calendar data, location data, diary entries, calorie applications, and other signal sources. For example, a user's location at a restaurant could indicate an eating event. In another aspect, a user's purchases at a grocery store could be used to determine, over the course of a week, for example, the type of food that the user is eating. Some users explicitly track calories using a diet program, diary, calorie-counting application, or other application. Signals from these applications can be used to determine that an eating event occurred as well as the contents of the eating event. As mentioned, the duration of the eating event, the amount of food consumed, and the style or category of the food consumed can be determined. For example, the user's eating events may indicate an interest in Mexican food. The eating events can be analyzed to determine a user's food interests. The user could be classified as having an interest in barbeque, Indian food, and steakhouses, for example. These interests can be used to select point of interest data for the user.

In one aspect, a work event can be a constituent of a point of interest usage data. A user work event can be detected through a variety of signals, including GPS data indicating a user's location is at a place of work, computer usage data indicating that the user is performing work through their computing device, communication records indicating that the user is communicating with known work associates, and such. A user's work events can be used to infer a level of interest in points of interest nearby a workplace.

In one aspect, transit or commute events can be a constituent of point of interest usage data. The transit event can be detected using user data, such as GPS data, that could indicate a length and velocity of movement. The transit event can be classified as a home-to-work commute or otherwise delineated by a start location and an end location. The time of day and duration of the transit event can also be recorded. In addition, the means of transportation (e.g., car, bus, train, bike) could be determined by analyzing a movement pattern. Points of interest along a user's commute can be included in the offline point of interest data.

In one aspect, a social event can be a constituent of point of interest usage data. A social event can comprise a gathering of friends and family for social interaction. A social event can be detected using calendar information indicating a social event, and GPS or other location data indicating a location consistent with a social event, such as a friend's house. A social event can also be detected by mining social network data for pictures, images, and posts, such as check-ins, communicating information about a particular social event, such as a birthday party, wedding, cookout, and such. The social event can be used to determine social connections and interests. For example, a user may be given point of interest data for places frequented by the user's friends. Point of interest data, especially second-tier and third-tier data, can be provided for places frequently visited by the user during social events.

In one aspect, a shopping event can be a constituent of point of interest usage data. The shopping event can be determined through location data, credit card information, browsing history, query history, etc. The shopping event can indicate that an item was purchased and a classification for the item. For example, an item could be classified as apparel, food, household item, etc. The user's purchase history can be used to determine interests.

Each identified event can be associated with contextual information directly related to the event, as well as peripheral contextual information describing other activities in a user's day that are not directly related to the event. The direct contextual information associated with an event can comprise a location where the event occurred, duration of the event, the presence of other people during the event, and such. The direct contextual information can be learned through analysis of user data captured during the event. The peripheral contextual information can include a description of a user's activities during the day, days, and hours before or after an event.

Aspects of the technology described herein can also use semantic data describing the user to determine user interests and related points of interest. Semantic information can include a user's social contacts, work contacts, interests, home location, work address, calendar data, tasks, and other information. The semantic data can be used to identify or define a user interest and points of interest for a specific user.

"Contextual signals," as utilized herein, may reflect any attribute of a user (for instance, physical characteristics), the user's historical interaction with the system (e.g., behavior, habits, and system interaction patterns), and/or the user's recent interaction with the system (with "recency" being defined in accordance with a predetermined time frame relative to a given point in time) that may affect the likelihood or probability that the user desires to engage in a particular activity. Such contextual signals may include, by way of example only and not limitation, the location of the user of the computing device (determined utilizing, for instance, Global Positioning System (GPS) signals, Internet Protocol (IP) address, or the like), the time of day (either general (for instance, morning or afternoon) or exact (for instance, 6:00 pm)), the date (either exact or generally a particular month, season, etc.), a physical characteristic of the user (for instance, if the user is paralyzed and capable of only voice input, or the like), a task currently engaged in on the computing device by the user, a task recently engaged in on the computing device by the user (again with "recency" being defined in accordance with a predetermined time frame relative to a given point in time), an object the user is currently engaged with on the computing device (for instance, an entity such as a contact, a file, an image, or the like), an object the user was recently engaged with on the computing device, a function currently being performed by the user on the computing device, a function recently performed by the user on the computing device, hardware currently being utilized on the computing device, hardware recently utilized on the computing device, software currently being utilized on the computing device, and software recently utilized on the computing device.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can facilitate the completion of tasks, such as searching a map application or navigating a route, and make a record of user activities. The devices can belong to many different users, and a single user may use multiple devices. The user activities can be analyzed to determine a user's interests, including geographic areas frequented by the user and the types of point of interest data a user may be likely to access.

Server 106 can comprise server-side software designed to work in conjunction with client-side software on user devices 102a and 102b through 102n so as to implement any combination of the features and functionalities discussed in the present disclosure. For example, the server 106 may run point of interest offline data engine 260, which identifies categories of entities a specific user may be interested in. The server 106 may receive activity records, such as location data, from a large number of user devices belonging to many users. This data can be described as crowdsourced data. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2. The data sources 104a through 104n can comprise a knowledge base that stores information about maps, points of interest, a user, or other entity related to a particular user action. The data sources 104a through 104n can also include websites associated with points of interest, and third-party websites that provide information about the point of interest, such as third-tier interest data.

Figure 2:
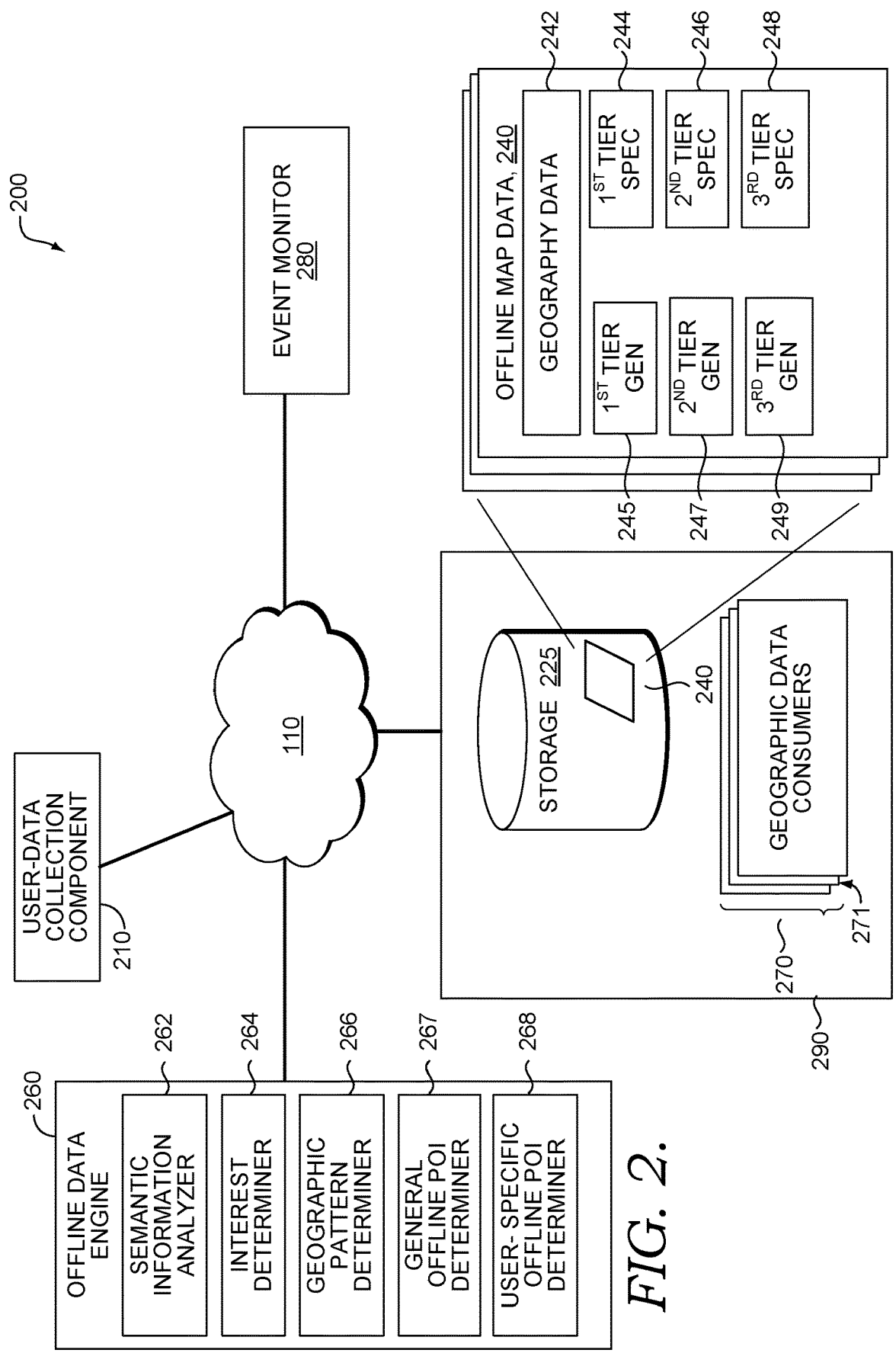
FIG. 2 is a diagram depicting an example computing architecture suitable for implementing aspects of the present disclosure.

Operating environment 100 can be utilized to implement one or more of the components of system 200, described in FIG. 2, including components for collecting user data, identifying user interests, general first-tier data, user-specific first-tier data, general second-tier data, user-specific second-tier data, general third-tier data, and user-specific third-tier data.

Referring now to FIG. 2, with FIG. 1, a block diagram is provided showing aspects of an example computing system architecture suitable for implementing an aspect and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively connects components of system 200 including user-data collection component 210, user event monitor 280, point-of-interest offline data engine 260, and client device 290. User event monitor 280, point-of-interest offline data engine 260 (including its components 262, 264, 266, 267, and 268), and geographic data consumers 270 may be embodied as a set of compiled computer instructions or functions, program modules, computer software services, or an arrangement of processes carried out on one or more computer systems, such as computing device 800 described in connection to FIG. 8, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some aspects, user-data collection component 210 may be employed to facilitate the accumulation of user data of a particular user (or in some cases, a plurality of users including crowdsourced data) for user event monitor 280, offline data engine 260, or a geographic data consumer 270. The data may be received (or accessed), and optionally accumulated, reformatted, and/or combined, by user-data collection component 210 and stored in one or more data stores, where it may be available to other components of system 200. For example, the user data may be stored in or associated with a user profile. In some aspects, any personally identifying data (i.e., user data that specifically identifies particular users) is either not uploaded or otherwise provided from the one or more data sources with user data, is not permanently stored, and/or is not made available to user event monitor 280 and/or offline data engine 260.

User data may be received from a variety of sources where the data may be available in a variety of formats. For example, in some aspects, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user-data associated with communication events; etc.) including, in some aspects, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle user data, traffic data, weather data (including forecasts), wearable device data (which may include physiological data about the user such as heart rate, pulse oximeter or blood oxygen level, blood pressure, galvanic skin response, or other physiological data capable of being sensed or detected), other user device data (which may include device settings, profiles, network-related information (e.g., network name or ID, domain information, work group information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 210 receives or accesses data continuously, periodically, or as needed.

User event monitor 280 is generally responsible for monitoring user data for information that may be used for identifying and defining point of interest events, which may include identifying and/or tracking features (sometimes referred to herein as "variables") or other information regarding specific user actions with points of interest. A point of interest event can be used as input to calculate an interest in categories of points of interest, such as Chinese restaurants. The "event" is a way to format relevant information for consumption by an interest classifier. In other words, the event record can follow a data schema that allows the interest classifier to determine interests from the event records. The event's occurrence and details can be inferred from the user data in some cases. For example, a location can be designated as the user's place of work because the user regularly spends time at the location during work hours. Using events, instead of actual data as input, can simplify the process of calculating an interest by providing a more uniform input across users.

Aspects of user event monitor 280 may determine, from the monitored user data, when the user participates in an exercise event, sleep event, eating event, work event, social event, or other event relevant to points of interest. In other words, the user event monitor 280 may receive user data and generate event data, such as a work event or social event. The event data can then be used to calculate an interest of a user. The event data does not need to be associated with a location or specific point of interest. For example, an exercise event showing the user running can be used to determine an interest in fitness points of interest, such as gyms and sports stores, even though the event did not take place at the gym or sports store.

User event monitor 280 may identify current or near-real-time user event information and may also identify historical user event information, in some aspects, which may be determined based on gathering observations of user data over time, accessing user logs of past event data (such as a social event data store). The historical user event information can be used to detect patterns related to interests. A user that visits a Chinese restaurant once may or may not have an actual interest in Chinese food, but a user that visits Chinese restaurants regularly is likely to have an interest in Chinese food.

In some aspects, information determined by user event monitor 280 may be provided to offline data engine 260 including information regarding the current context and historical events (historical observations). For example, the user event monitor 280 can provide event records for use by the offline data engine 260.

In some aspects, user event monitor 280 or other components of system 200, such as offline data engine 260, may determine interpretive data from received user data. Interpretive data corresponds to data utilized by these components of system 200 or user event monitor 280 to interpret user data. For example, interpretive data can be used to provide other context to user data, which can support determinations or inferences made by the components or subcomponents. Moreover, it is contemplated that aspects of user event monitor 280, other components of system 200 may use user data and/or user data in combination with interpretive data for carrying out the objectives described herein. Additionally, although several examples of how user event monitor 280 may identify user event information are described herein, many variations of event identification and user event monitoring are possible in various aspects.

In some aspects, the user point-of-interest-related features may be interpreted by a machine classification process to determine that an event has occurred. For example, in some aspects, user event monitor 280 employs user event logic, which may include rules, conditions, and/or associations, to identify or classify user events. The classifying of events (e.g., eating, sleep, work, social, exercise, transit) can be based on feature-matching or determining similarity in features, which falls under pattern recognition. This type of classification may use pattern recognition, fuzzy logic, neural network, finite state machine, support vector machine, logistic regression, clustering, or machine-learning techniques, similar statistical classification processes, or combinations of these to identify events from user data. For example, exercise logic may specify types of physiological information that are associated with an exercise event, such as a user's heart rate staying a threshold amount above a baseline for a designated duration, in combination with location or movement data. Different patterns of activity may be mapped to different events. For example, running, cycling, swimming, golf, tennis, and soccer may all have different activity patterns.

In some aspects, a user may specify features used for detecting an event or even a specific type of event. For example, upon detecting a possible social event, a personal assistant application may ask the user to confirm that she just watched a movie with friends A, B, and C, and may ask the user what movie was watched. Based on this feedback, activity patterns can be learned for the user and used to identify future social events. Similarly, event patterns from other users can be used to recognize events for a particular user.

In aspects using contextual information related to user devices, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some aspects, a device name or identification (device ID) may be determined for each device associated with a user. This information about the identified user devices associated with a user may be stored in a user profile associated with the user, such as in user account(s). In an aspect, the user devices may be polled, interrogated, or otherwise analyzed to determine contextual information about the devices. This information may be used for determining a label or identification of the device (e.g., a device ID) so that contextual information about an exercise event captured on one device may be recognized and distinguished from data captured by another user device. In some aspects, users may declare or register a user device, such as by logging into an account via the device, installing an application on the device, connecting to an online service that interrogates the device, or otherwise providing information about the device to an application or service. In some aspects, devices that sign into an account associated with the user, such as a Microsoft® account or Net Passport, email account, social network, or the like, are identified and determined to be associated with the user.

Continuing with system 200 of FIG. 2, offline data engine 260 is generally responsible for determining what groups of point of interest data should be provided to individual users based on the information determined from user event monitor 280. In some aspects, offline data engine 260 may run on a server, as a distributed application across multiple devices, or in the cloud.

One or more inference algorithms may be applied to the user information to determine a set of user interests that map to point of interest categories. In some aspects, a corresponding confidence for the interest score is also determined. For example, a user with a lot of data indicating an interest in sports bars may receive a score with a higher confidence than a user with less data indicating an interest in sports bars. Additionally, some user data is effectively given more weight than other data when determining an interest. A user associated with data given more weight may have a higher confidence score.

As shown in example system 200, offline data engine 260 comprises semantic information analyzer 262, interest determiner 264, geographic pattern determiner 266, general point of interest determiner 267, and user-specific point of interest determiner 268. Semantic information analyzer 262 is generally responsible for determining semantic information associated with the event related features identified by user event monitor 280. For example, while an event feature may indicate a specific type of exercise (e.g., tennis), the semantic analysis may determine the tennis club the user belongs to, playing partners at the club, upcoming tennis tournaments the user has registered for, or other entities associated with the event. Semantic information analyzer 262 may determine additional event related features semantically related to the event that may be used for identifying user interest patterns and/or point of interest visitation patterns. For example, the user plays tennis twice a week in the summer often at different tennis clubs around a city. Such an observation could lead to inclusion of first, second, and third-tier information for all tennis clubs in the city as well as for sports stores serving the needs of tennis players.

In some aspects, semantic information analyzer 262 may utilize a semantic knowledge representation, such as a relational knowledge graph, to connect interests with points of interest. Semantic information analyzer 262 may also utilize semantic analysis logic, including rules, conditions, or associations to determine semantic information related to the user point of interest interaction patterns. For example, a user exercise event comprising playing a sport with someone who works with the user may be used to assume the user and his/her teammate have common interests. Information known about the teammate's travel related to the sports league can be used to anticipate geographic areas the user will be encountering in the future, that might otherwise be unknown. In other words, semantic knowledge about people associated with a user can be used to fill in knowledge gaps about a user or make available information more certain. Anticipating travel can be used to provide specific point of interest information for the areas traveled to.

Interest determiner 264 receives user data and determines that the user has one or more interests that can be mapped to a point of interest category. The interest determiner 264 can generate new interests periodically, such as hourly, daily, or weekly. The interest can be generated heuristically or by using machine learning, such as a specially trained machine classifier. The heuristic approach can assign a value to a variable based on user activities and events derived from the user data. For example, visiting a Chinese restaurant twice within a month could cause the user to be classified as having an interest in Chinese food. Other event data can be mapped to other interests in a similar fashion. Each variable could be assigned a weight, and then the weight could be combined with the assigned value to determine an interest.

A classifier could be trained to receive user input and classify the user into an interest category. Generally, the classifier can be trained by inputting representative user data into the classifier and forcing the classifier to calculate a specific score corresponding to a classification. For example, a batch of user data could be input to the classifier and constrained with an interest in baseball. A second batch of user data could be input to the classifier and constrained to an interest in tennis. This process can be repeated until the nodes or features of the classifier are assigned values that result in a similar classification being calculated when similar data is input. Once trained, the classifier can receive user data and generate a classification. The interest classification can be associated with a confidence factor that is also derived from the input. The classifier can receive a large range of values associated with different variables. In some instances, no data will be available for various variables. The difference in the amount of data and type of data as well as the values associated with the data can cause a different confidence score. In some instances, the confidence score can determine how the user-specific point of interest determiner 268 uses data. For example, scores associated with a low confidence value could be excluded from use when selecting second or third-tier point of interest data.

Geographic pattern determiner 266 is generally responsible for determining a user's geographic pattern based on user data, including location data, such as GPS data. The geographic pattern shows areas where the user spends different amounts of time. Very generally, the user may spend a large amount of time around a work or home area. The user may also have other areas that are visited frequently, such as businesses along a commuter route, entertainment districts, friend's homes, gyms, and such. The amount of time spent in different areas can be used to determine a location pattern. The location pattern can be used to provide more information (e.g., second and third-tier information) for entities located near the user's location pattern.

As mentioned, the user location profile may be built by analyzing user location data. The user location data describes locations the user has been in the past. The user location data may be gathered by one or more location enabled devices. Location enabled devices can include the user's GPS-enabled device, such as a smartphone. Other methods of gathering a user's user location data may be used in combination with or instead of information provided by a location enabled device.

Additional user location data includes the user's or others' social posts. For example, a user could be tagged in a post that is associated with an entity having a known location, such as a concert venue. The social posts may include the name of a restaurant or other business having a known location.

An additional type of location data is the user's profile or profiles. For example, a user's profile on a social network may include designations of one or more cities in which the user has lived. A user profile may include a home address, work address, or other information provided when registering a device or subscribing to a service.

Figure 3:
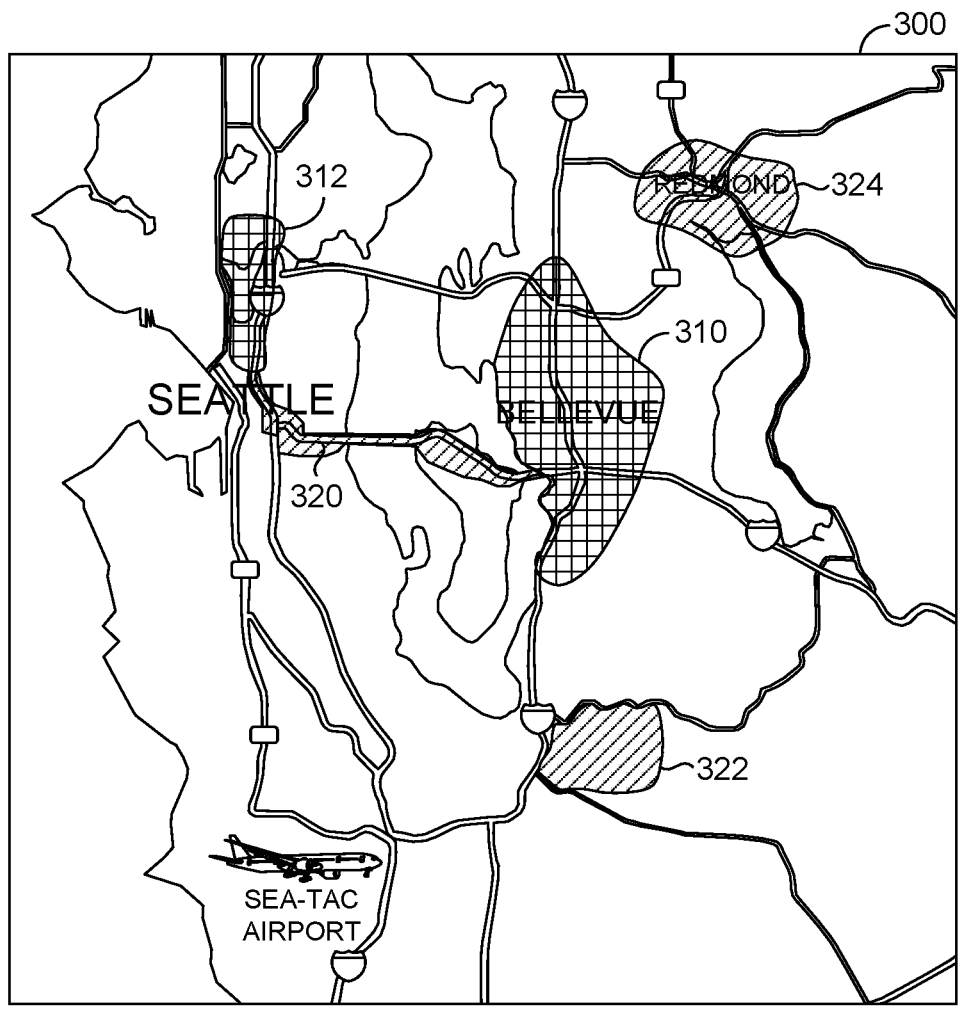
FIG. 3 shows a geographic display of user contact levels with different geographic areas, in accordance with an aspect of the technology described herein.

Turning now to FIG. 3, a map 300 of a user's location pattern within the Seattle metropolitan area is provided, in accordance with an aspect of the present disclosure. As mentioned, a person can have different levels of contact with different areas. Aspects of the technology described herein analyze location data to determine a user's time spent in different areas. Three different contact levels are shown on map 300. Geographic zone 310 and geographic zone 312 are assigned the highest level of contact. Geographic zone 320, geographic zone 322, and geographic zone 324 are assigned a medium level of contact. All other areas of the Seattle metropolitan area are assigned a low level of contact. Aspects of the technology described herein are not limited to using three levels of contact.

Geographic zone 310 corresponds to the city of Bellevue. In the present example, the user may live in the city of Bellevue and commute through geographic zone 320 to Seattle. The user may work in geographic zone 312, which does not encompass the entire city of Seattle, but only an area where the user's location data indicates the user is present a significant amount of time. Because the user either lives or works in geographic zones 310 and 312, the user may be assumed to have an interest with nearby businesses. Offline point of interest data may be customized based on the high level of contact with these areas to ensure that the user can access information about businesses in this area while offline.

Geographic zone 320 covers the user's commute route between Seattle and Bellevue. Geographic zone 320 is assigned a medium level of contact. While the user is frequently present within geographic zone 320, the user may not stop within geographic zone 320 on a frequent basis. This illustrates that the geographic zone can be assigned based on both a user's frequent presence within a zone and the type of activities that the user is engaged in while in the zone. Driving through an area frequently without stopping to eat, shop, or perform other activities may give the user only a moderate interest in information about entities in this zone.

Geographic zone 324 and geographic zone 322 are assigned a medium level of contact. Notice that the route to these zones is classified as low (low contact is designated by the absence of hashing), indicating that the user is not frequently present on a route to these locations above a threshold required to satisfy a medium level of contact. In this example, the user previously lived in geographic zone 322 and previously worked in geographic zone 324. The user may still visit these zones on occasion.

Though not shown, geographic zones 322 and 324 were previously assigned a high contact level when the user lived or worked in the zones. The current medium contact level illustrates that the geographic zones can be adjusted based on recent location activity. In effect, the contact level assignment can give more weight to recent location data causing the geographic zone rating to decay over time when the user spends less time in an area.

In one aspect, the contact zones are derived from a heat map. A heat map organizes a user's location data into regions running, metaphorically, from hot to cold. The hot areas can represent areas the user visits frequently and the cold areas represent areas the user never visits. A great number of gradients between hot and cold are possible. The heat map can delineate small differences in a user's location history. For example, an area the user visits five times a week may be differentiated from an area the user visits six times a week. The familiarity zones may be mapped to a threshold range in the heat map. For example, areas having a location frequency above a threshold may be assigned a certain contact range. Thus, an area a user visits five times a week may be grouped into the same contact category as an area visited six times a week.

The threshold used to form a contact frequency may be established editorially to delineate the type of point of interest data a person is likely to want given their contact level. In other words, the threshold can be set editorially to identify areas the user has different levels of contact with in a way that maps to likely information needs. Classifying an area into a zone scheme and a customization policy into the same zone scheme allows for a one-to-one comparison when selecting a point of interest customization. Alternatively, in one aspect, a contact frequency is a range within the heat map and the actual zones need not be delineated as shown in FIG. 3. Instead, the customization scheme is defined by a range on the heat map, and the rating on the heat map for the area of interest can serve as the contact frequency level.

The general point of interest determiner 267 determines offline map data that is communicated to all devices associated with a geographic area without regard to a particular person's interests or activity. The offline map data can be generated and communicated to a user device accordingly to method 500 described below. The offline map data 240 can include first-tier general data 245, second-tier general data 247, and third-tier general data 249. The offline data can be stored in computer storage 225 on the user device. The offline map data 240 can also include geography data 242, which is used to generate maps, roads, and directions. The geography data 242 can be provided based on the geographic area(s) associated with the user.

The user-specific point of interest determiner 268 builds user-specific offline data sets based on a user's interests and activity. The offline map data can be generated and communicated to a user device according to method 500 described below. The offline map data 240 can include first-tier specific data 244, second-tier specific data 246, and third-tier specific data 248. The offline data can be stored in computer storage 225 on the user device.

Continuing with FIG. 2, example system 200 includes one or more geographic-data consumers 270, which comprise applications or services that consume geographic data to provide user experiences. The geographic data may be provided to the geographic-data consumers 270 through an API. Examples of geographic-data consumer 270 may include, without limitation, fitness monitoring and training applications, navigation applications, search applications, personal assistant applications, shopping applications, social applications, and reservation applications.

In particular, a first example geographic-data consumer 270 comprises a search application. In one aspect, a geographic search application 271 is provided to facilitate providing a personalized geographic search, while offline. The application 271 may work with an online service (not shown), but may also use the local offline map data 240 as needed. Thus, geographic search application 271 may be considered one example of an application that may consume offline map data 240. The geographic search application 271 may receive a query, such as "nearby restaurants," and provide a search results interface, such as interface 400, described subsequently. The geographic search application 271 may rely entirely on offline map data 240 to generate the interface.

Figure 4:
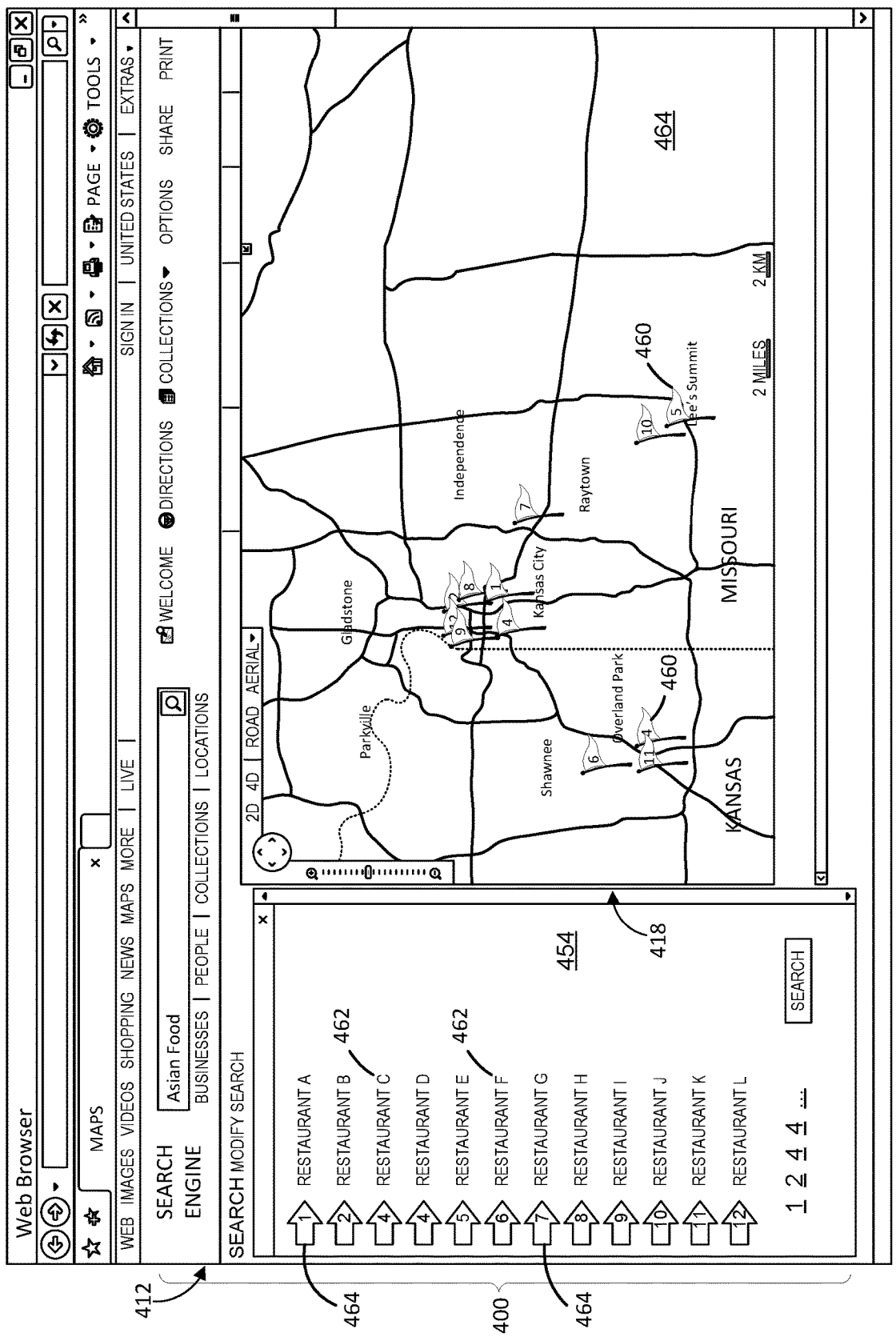
FIG. 4 shows a geographic display showing first-tier information for points of interest within the geographic area depicted, in accordance with an aspect of the technology described herein.

The indications ("indicators") include a graphic, image, or the like that can be displayed on a map. For example, the indicators might include an image or graphic of a flag (indicators 460 of FIG. 4), dots, and stars, among a variety of others. The indicators are located on the map at or near the location indicated by the metadata associated with the point of interest that is represented by the indicator. The metadata may provide latitude and longitude for the point of interest. As depicted in FIG. 4, the indicators 460 may include a number or other reference to allow a user to identify the indicators 460 with a corresponding search result listing 462 provided in a search results pane 454. In an embodiment, the indicators are also selectable by a user to present or direct the user to content of the detail page associated with a particular point of interest. The detail page includes additional information not communicated in the search result for the point of interest.

With continued reference to FIG. 4, an exemplary search interface 400 depicting pinpoint locations (indicators 460) of points of interest on a map 464 in accordance with an embodiment of the invention is described. The search interface 400 is displayed in a display pane 412 of a web browser window 402. The search interface 400 includes a location portion 418 displaying a map 464 that depicts the geographic area around Kansas City, Mo. The search interface 400 also includes a search results pane 454 that provides search results 462 for each point of interest. The search results 462 may be selectable by a user to present a detail page for a particular point of interest. Each of the results 462 may also include an associated indicator 460 that aids in identifying a corresponding point of interest on the map 460.

Figure 5:
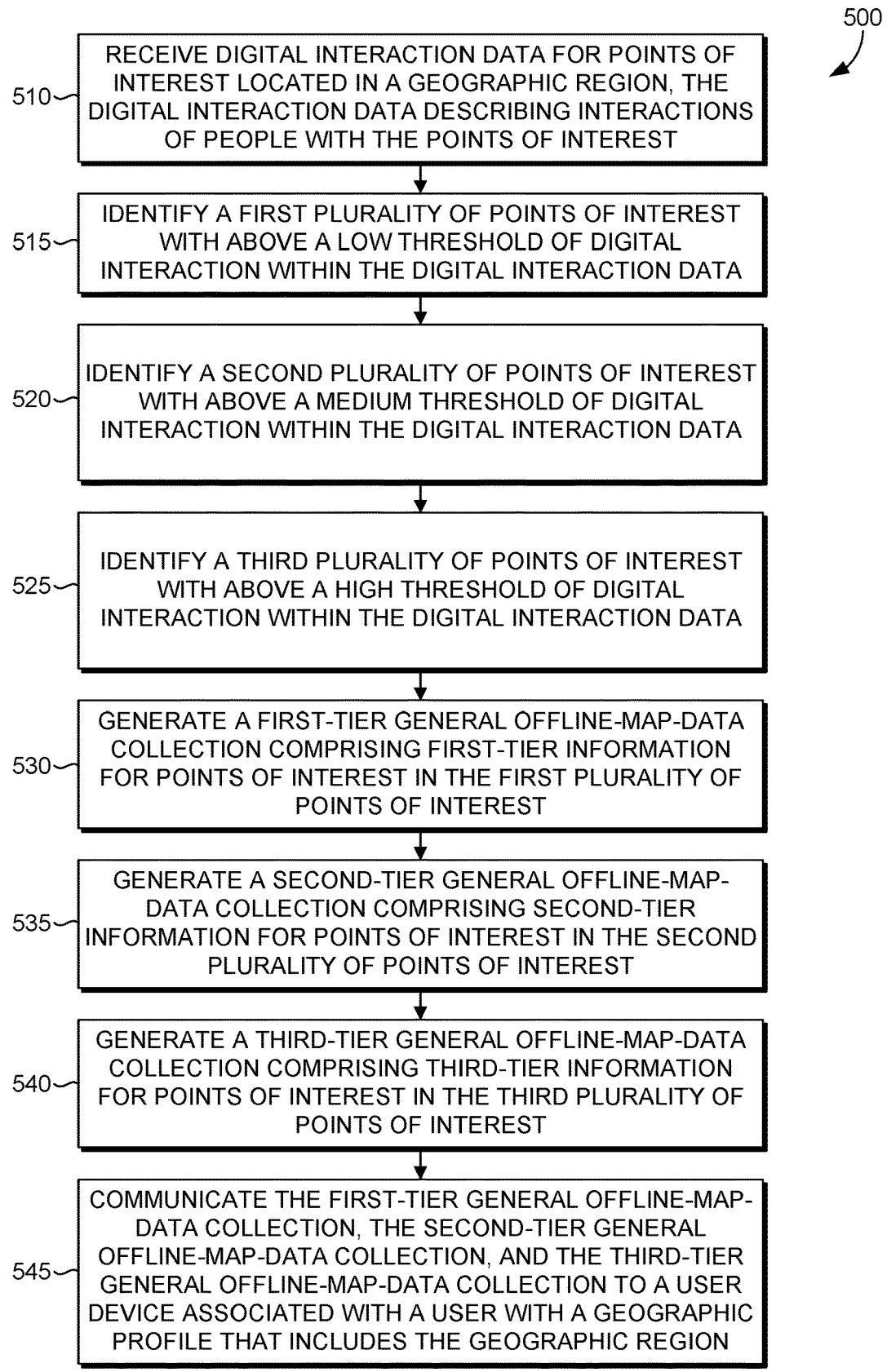
FIGS. 5-7 are flow diagrams showing exemplary methods of inferring an energy level, in accordance with an aspect of the technology described herein.

Turning now to FIG. 5, a flow chart depicting steps in a method 500 of storing point of interest data for offline consumption is shown, in accordance with technology described herein. Method 500 may be performed by a user device, as described previously. The offline map data is associated with a geographic region, such as a metropolitan area for a city. A user may be associated with multiple geographic regions.

At step 510, digital interaction data for points of interest located in a geographic region is received. The digital interaction data describes interactions of people with the points of interest. The digital interaction data is a computer record of user interactions which can be virtual or real. Real interactions are a user physically visiting a point of interest as indicated by signal data, such as GPS data collected from a user device associated with the user. Virtual interactions include traffic to a website associated with the point of interest, social media interactions, chat bot interactions, search queries, search result interactions, and such. The interaction data can be collected from multiple sources.

At step 515, a first plurality of points of interest with above a low threshold of digital interaction within the digital interaction data is identified. The low threshold is designed to be a minimum filter that results in a large number of points of interest within a geographic region satisfying the low threshold. The low threshold may specify an amount of interaction or a rank cut off. The amount of interaction could be adjusted based on the population of the geographic region. For example, the amount of interaction could be equivalent to 0.01% of the population interacting with the point of interest per year. The relevance cut off could specify the top X points of interest as ranked by interactions. For example, the low threshold could be the top 2,000 points of interest in a region. The rank could be calculated by giving different types of interactions more weight. For example, requesting directions to a point of interest could be given more weight than accessing its website. In one aspect, map related interactions are given twice the weight as non-map related interactions when generating a score used to rank the point of interest.

The low threshold can be calculated based on data storage allocated on a user device for offline map storage. For example, if 10 MB are allocated on a user device, then 60% could be allocated to the first plurality of points, which would be stored as first-tier general data, as described below. In this example, the low threshold could be set to collect point of interest data that totals 6 MB.

At step 520, a second plurality of points of interest with above a medium threshold of digital interaction within the digital interaction data is identified. The medium threshold is different from the low threshold. The second plurality will be smaller than the first plurality because of the different threshold. The medium threshold can measure the same unit of measure as used with the first plurality or a different unit of measure. The medium threshold is used to generate second-tier data, such as is found on a website landing page for a point of interest. In one aspect, the low threshold looks at total interactions, while the medium threshold only looks at virtual interactions with the point of interest's website. Points of interest with website traffic that satisfy the medium threshold are included in the second plurality.

As with the low threshold, the medium threshold can specify an amount of interaction or a rank cut off. The amount of interaction could be adjusted based on the population of the geographic region. For example, the amount of interaction could be equivalent to 0.01% of the population interacting with the point of interest per year. The rank cut off could specify the top X points of interest as ranked by interactions. For example, the medium threshold could be the top 200 points of interest in a region. The rank could be calculated by giving different types of interactions more weight. For example, online reservations may be discounted compared to looking at the menu. Because the technology facilitates offline use, interactions that must be online, such as reservations, may be given less weight than data that could be reproduced offline, such as a menu.

The medium threshold can be calculated based on data storage allocated on a user device for offline map storage. For example, if 10 MB are allocated on a user device, then 10% could be allocated to the second plurality of points, which would be stored as second-tier general data, as described below. In this example, the medium threshold could be set to collect point of interest data that totals 1 MB.

At step 525, a third plurality of points of interest with above a high threshold of digital interaction within the digital interaction data is identified. The high threshold is different from the medium threshold and the low threshold. The difference can be any amount and/or unit of measure used. The third plurality will be used to collect third-tier data for the points of interest in the group. The third-tier data comprises third-party reviews of the points of interest. In one aspect, the high threshold measures third-party reviews for a point of interest. The high threshold could be a specific number of reviews or a cut off rank of reviews. The high threshold can be adjusted based on population of a region in which the point of interest is located.

User-specific first-tier, user-specific second-tier, and user-specific third-tier points of interest can also be generated. The same units of measure as used with the low threshold, medium threshold, and high threshold can be used. The difference is that the input is specific to a user. In one instance, the user is classified into one or more interests. Then point of interest interaction data for users having interest(s) in common is evaluated against the thresholds. User-specific data sets for each tier can then be generated and communicated to the user device for offline use.

At step 530, a first-tier general offline-map-data collection comprising first-tier information for points of interest in the first plurality of points of interest is generated. The data can be generated by extracting information needed to generate a search result for the points of interest from an index or other data stream used by a search service to generate search results. The first-tier data includes information needed to generate an indication of where the point of interest is located on a map, such as described with reference to FIG. 4. The first-tier point of interest data includes information required to display a point of interest on a map by the map application. The first-tier data can include identification information for the point of interest, such as a name of a business. The first-tier data can also include location information for the point of interest. Location information can include longitude and latitude information that is used to accurately display a point of interest on a map. The location information can also include an address that is displayable to the user and can help the user find the location in the real world.

The first-tier information can also include information used to generate a search result for the point of interest. The search result information can include classification information that is used to determine when the point of interest is relevant to a query. The classification scheme can include multiple levels. For example, a restaurant may be classified as a restaurant, and then by food type, by price, and by other factors. The search result information in the first-tier data can also include a snippet about the point of interest that can be used to generate a search result describing the point of interest to the user.

At step 535, a second-tier general offline-map-data collection comprising second-tier information for points of interest in the second plurality of points of interest is generated. The second-tier point of interest information includes information provided by selecting a point of interest on a map or a search result for the point of interest. The second-tier information is provided by an entity associated with the point of interest. For example, on a web page provided by the entity. Note that a single entity can be associated with multiple points of interest. For example, a corporation is an entity that may have multiple stores, where each store is an individual point of interest. In one aspect, the second-tier information includes a copy of a homepage for the point of interest. The second-tier information could also include hours of operation, daily specials, a menu, movie showings and associated start times, and other information.

At step 540, a third-tier general offline-map-data collection comprising third-tier information for points of interest in the third plurality of points of interest is generated. The third-tier information includes information about the point of interest provided by a third party. For example, an aggregate rating and/or written reviews for the point of interest provided by a third-party website or application.

At step 545, the first-tier general offline-map-data collection, the second-tier general offline-map-data collection, and the third-tier general offline-map-data collection are communicated to a user device associated with a user with a geographic profile that includes the geographic region.

Figure 6:
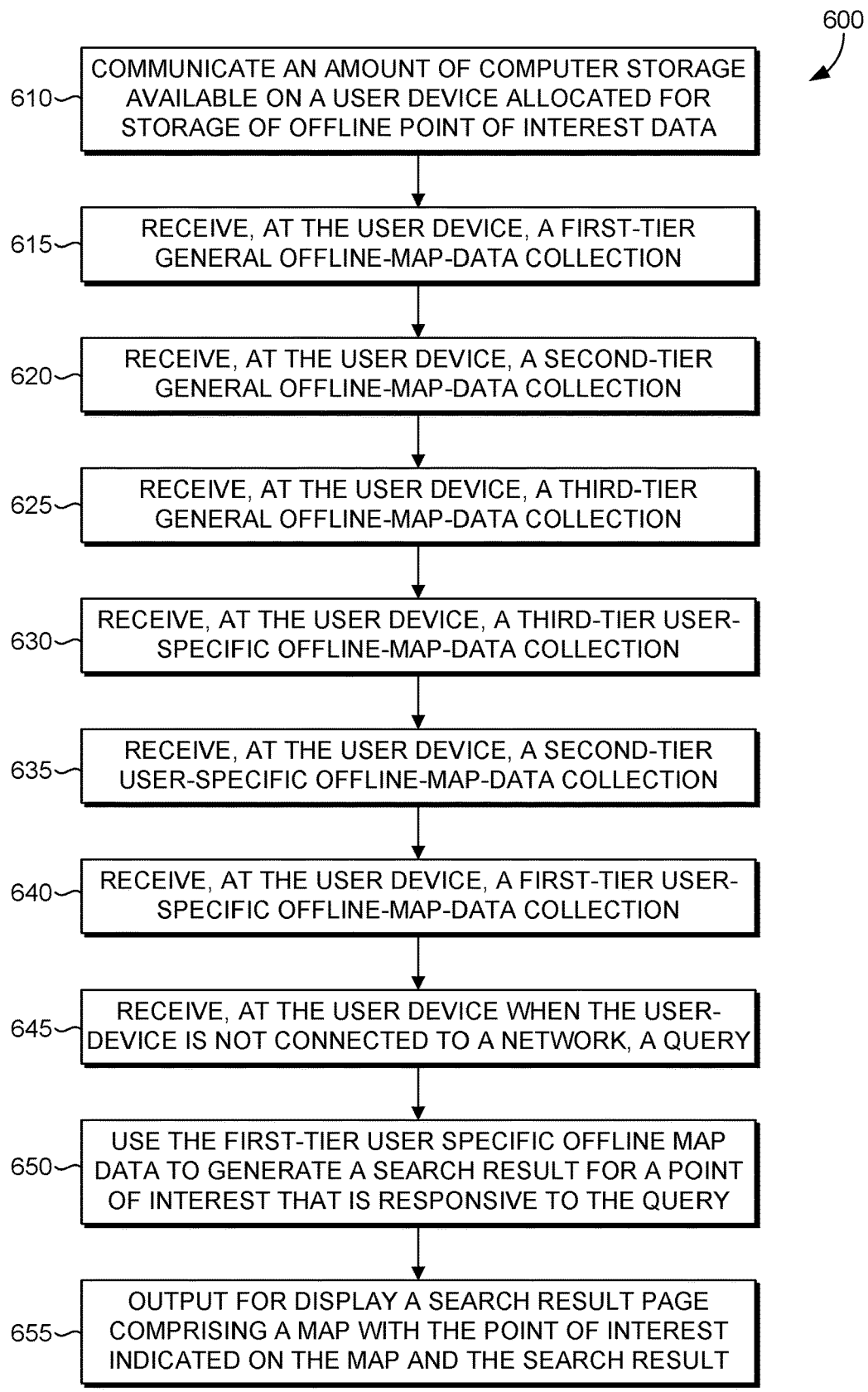

Turning now to FIG. 6, a flow chart depicting steps in a method 600 of storing point of interest data for offline consumption is shown, in accordance with technology described herein.

At step 610, an amount of computer storage available on a user device allocated for storage of offline point of interest data is communicated to a map service. The map service may use the amount of storage to allocate amounts of the offline storage to different types of offline map data sets. The storage can be allocated in different ways. In one aspect, a static partitioning is used based on percentages. For example, 70% could be allocated to first-tier general offline map data, 10% to first-tier user-specific offline map data, 5% to second-tier general offline map data, 5% to second-tier user-specific offline map data, 5% to third-tier general offline map data, and 5% to third-tier user-specific offline map data. Other percentage-based allocations are possible. In another aspect, the percentages are adjusted based on previously observed user activity. For example, if the user has not accessed second or third-tier information when online in the past, then less memory may be allocated to second and third-tier information. A hybrid method may also be used that uses a fixed first-tier general data package and then allocates the balance of allocated memory to the other categories of offline map data. The balance could be allocated evenly or by likelihood of use as determined by previous user activity.

The service can set thresholds for different types of offline map data in order to make the best use of the available storage. For example, the low threshold amount of digital interaction, the medium threshold amount of digital interaction, the high threshold amount of digital interaction, the user-specific high threshold amount, the user-specific medium threshold amount, and the user-specific low threshold amount could be set based on available storage. For example, if 10 MB is allocated to offline first-tier general map data and a possible 40 MB of first-tier general map data is available, then (assuming the record for each point of interest is the same size) the threshold could be set at an activity level consistent with selecting points of interest with the top 25% of user interaction. The other threshold could be set in a similar manner. Thus, the threshold can be based on the interaction amount, but does not need to specify the amount specifically. The threshold can be set in any unit to retrieve data for the top X points of interest. Alternatively, the threshold can be an amount, such as X interactions per person living in a geographic area or just total interactions.

At step 615, a first-tier general offline-map-data collection comprising first-tier information for points of interest in a first plurality of points of interest with above a low threshold of digital interaction within the digital interaction data is received at a user device.

At step 620, a second-tier general offline-map-data collection comprising second-tier information for points of interest in a second plurality of points of interest with above a medium threshold of digital interaction within the digital interaction data is received at the user device. The medium threshold is different from the low threshold amount. The second-tier general offline-map-data collection is stored on the user device that received the data. The general data may be specific to a geographic area. The general data may be communicated to every device associated with the geographic area.

At step 625, a third-tier general offline-map-data collection comprising third-tier information for points of interest in a third plurality of points of interest with above a high threshold of digital interaction within the digital interaction data is received at a user device. The high threshold is different from the medium threshold amount.

At step 630, a third-tier user-specific offline-map-data collection comprising third-tier information for each point of interest in a fourth plurality of points of interest with above a user-specific high threshold of digital interaction within the digital interaction data from a plurality of users that fit a profile associated with the user is received at the user device. The fourth plurality of points of interest includes a point of interest not included in the third plurality of points of interest.

At step 635, a second-tier user-specific offline-map-data collection comprising second-tier information for each point of interest in a fifth plurality of points of interest with above a user-specific medium threshold of digital interaction within the digital interaction data from a plurality of users that fit a profile associated with the user is received at the user device. The fifth plurality of points of interest includes a point of interest not included in the second plurality of points of interest.

At step 640, a first-tier user-specific offline-map-data collection comprising first-tier information for each point of interest in a sixth plurality of points of interest with above a user-specific low threshold of digital interaction within the digital interaction data from a plurality of users that fit a profile associated with the user is received at the user device. The sixth plurality of points of interest includes a point of interest not included in the first plurality of points of interest.

At step 645, when the user device is not connected to a network, receive a query at the user device. For example, the query could be spoken to a personal assistant, entered into a search box, entered into a search box within a map application, or otherwise provided to an application or software running on user device.

At step 650, the first-tier user-specific offline map data is used to generate a search result for a point of interest that is responsive to the query. Remote data is not accessed to provide the search result. For example, a server or online service does not help provide the search result. Instead, possible results are generated from the offline map data and ranked by relevance.

At step 655, a search result page comprising a map with the point of interest indicated on the map and the search result is output for display on the user device.

Figure 7:
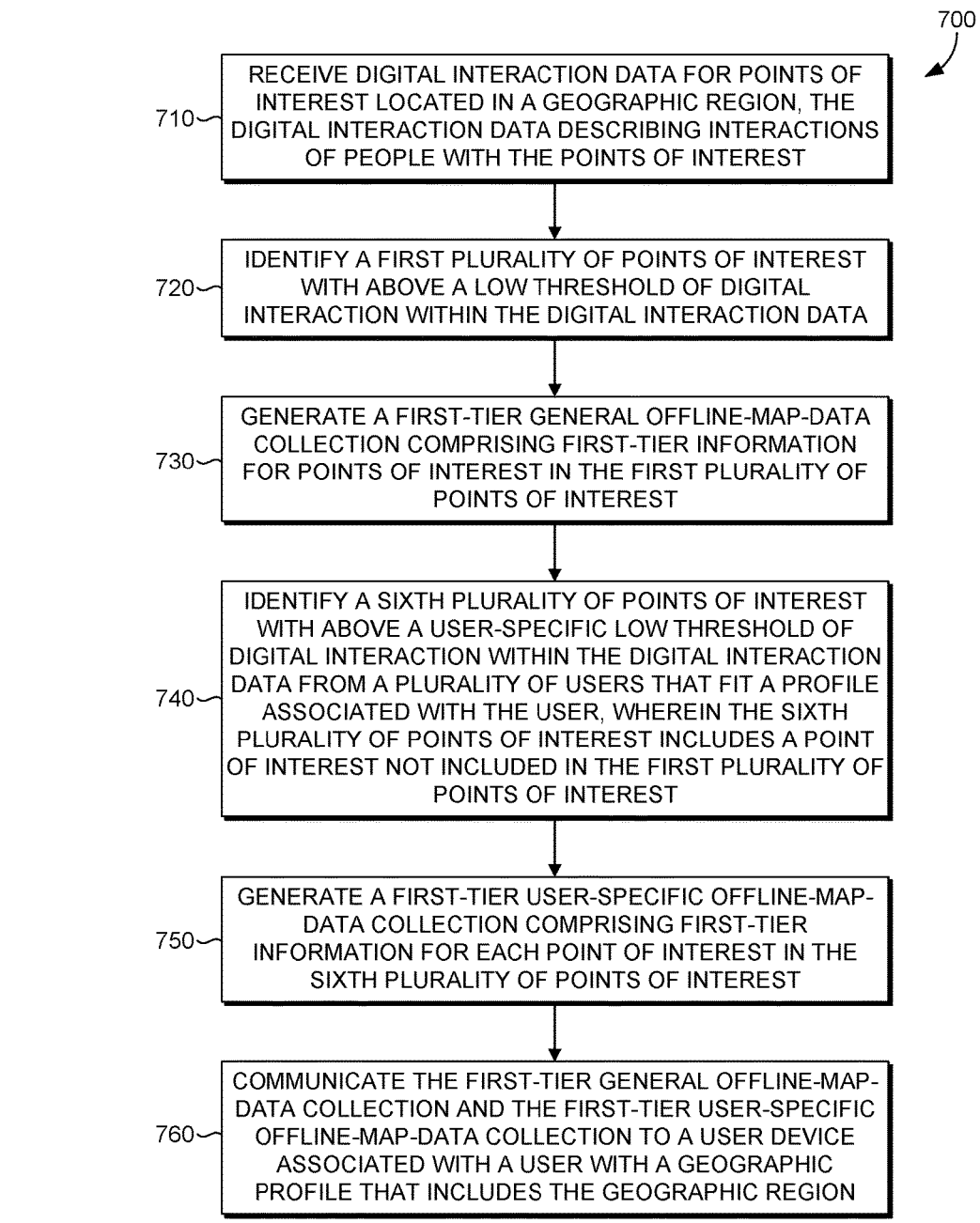

Turning now to FIG. 7, a flow chart depicting steps in a method 700 of storing point of interest data for offline consumption is shown, in accordance with technology described herein.

At step 710, digital interaction data for points of interest located in a geographic region is received. The digital interaction data describes interactions of people with the points of interest.

At step 720, a first plurality of points of interest with above a low threshold of digital interaction within the digital interaction data are identified.

At step 730, a first-tier general offline-map-data collection comprising first-tier information for points of interest in the first plurality of points of interest is generated.

At step 740, a sixth plurality of points of interest are identified. The sixth plurality of points have above a user-specific low threshold of digital interaction within the digital interaction data from a plurality of users that fit a profile associated with the user. The sixth plurality of points of interest includes a point of interest not included in the first plurality of points of interest.

At step 750, a first-tier user-specific offline-map-data collection comprising first-tier information for each point of interest in the sixth plurality of points of interest is generated.

At step 760, the first-tier general offline-map-data collection and the first-tier user-specific offline-map-data collection is communicated to a user device associated with a user with a geographic profile that includes the geographic region.

Exemplary Operating Environment

Figure 8:
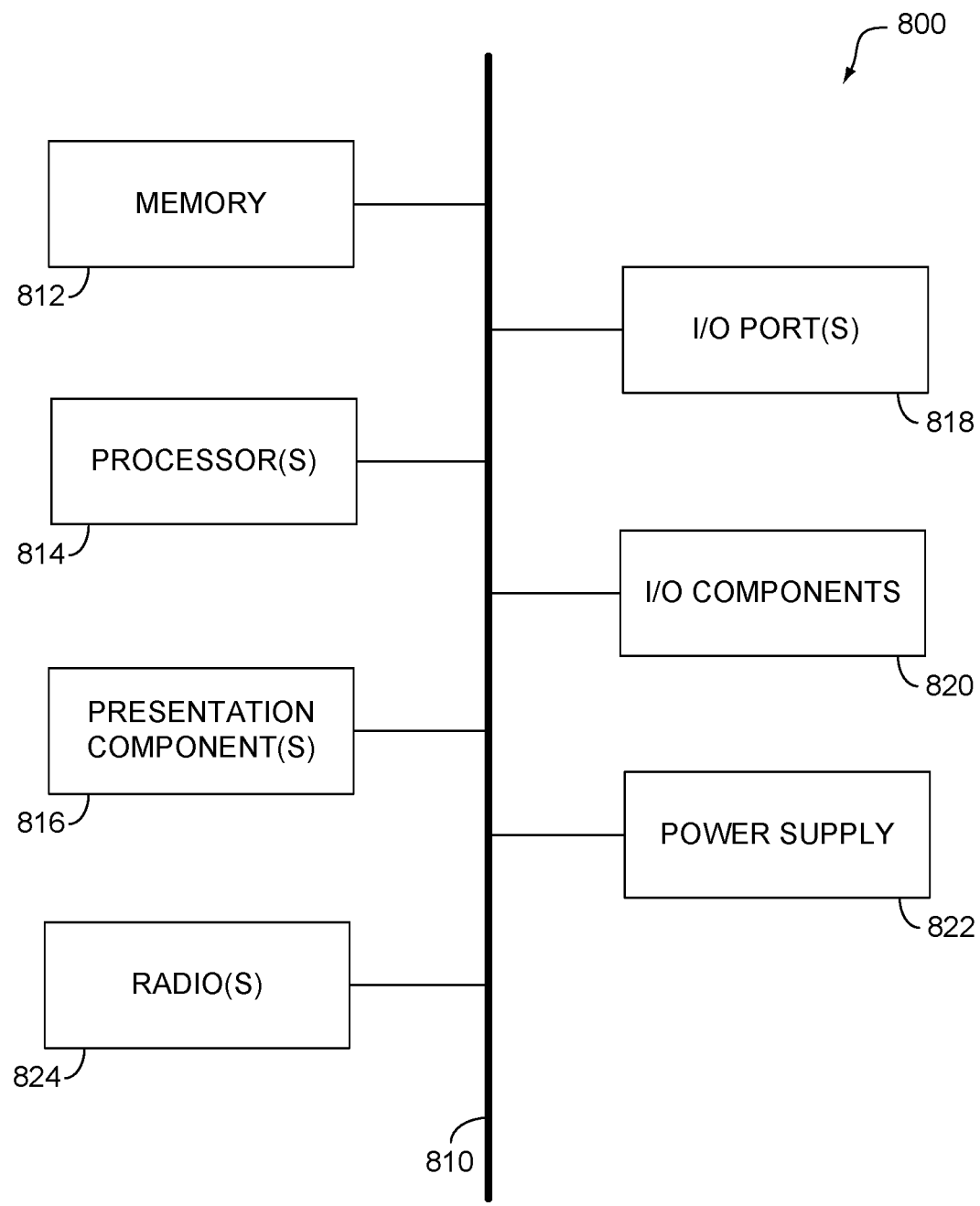
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, and an illustrative power supply 822. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, optical-disc drives, etc. Computing device 800 includes one or more processors 814 that read data from various entities such as bus 810, memory 812, or I/O components 820. Presentation component(s) 816 present data indications to a user or other device. Exemplary presentation components 816 include a display device, speaker, printing component, vibrating component, etc. I/O ports 818 allow computing device 800 to be logically coupled to other devices, including I/O components 820, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 800. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include a radio 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to perform a method of storing point of interest data for offline consumption, the method comprising:

receiving digital interaction data for points of interest located in a geographic region, the digital interaction data describing interactions of people with the points of interest;

identifying a first plurality of points of interest with above a low threshold of digital interaction within the digital interaction data;

identifying a second plurality of points of interest with above a medium threshold of digital interaction within the digital interaction data, wherein the medium threshold is different from the low threshold;

identifying a third plurality of points of interest with above a high threshold of digital interaction within the digital interaction data, wherein the high threshold is different from the medium threshold and the low threshold, and wherein an individual point of interest with above the high threshold of digital interaction is also above the medium threshold and the low threshold;

generating a first-tier general offline-map-data collection comprising first-tier information for points of interest in the first plurality of points of interest;

generating a second-tier general offline-map-data collection comprising second-tier information for points of interest in the second plurality of points of interest;

generating a third-tier general offline-map-data collection comprising third-tier information for points of interest in the third plurality of points of interest; and communicating the first-tier general offline-map-data collection, the second-tier general offline-map-data collection, and the third-tier general offline-map-data collection to a user device associated with a user with a geographic profile that includes the geographic region.

2. The media of claim 1, wherein a point of interest is a business.

3. The media of claim 1, wherein the method further comprises;

identifying a fourth plurality of points of interest with above a user-specific high threshold of digital interaction within the digital interaction data from a plurality of users, wherein the plurality of users fit a profile associated with the user, wherein the fourth plurality of points of interest includes a point of interest not included in the third plurality of points of interest;

generating a third-tier user-specific offline-map-data collection comprising third-tier information for each point of interest in the fourth plurality of points of interest; and communicating the third-tier user-specific offline-map-data collection to the user device.

4. The media of claim 1, wherein the method further comprises;

identifying a fifth plurality of points of interest with above a user-specific medium threshold of digital interaction within the digital interaction data from a plurality of users, wherein the plurality of users fit a profile associated with the user, wherein the fifth plurality of points of interest includes a point of interest not included in the second plurality of points of interest;

generating a second-tier user-specific offline-map-data collection comprising second-tier information for each point of interest in the fifth plurality of points of interest; and communicating the second-tier user-specific offline-map-data collection to the user device.

5. The media of claim 1, wherein the method further comprises;

identifying a sixth plurality of points of interest with above a user-specific low threshold of digital interaction within the digital interaction data from a plurality of users, wherein the plurality of users fit a profile associated with the user, wherein the sixth plurality of points of interest includes a point of interest not included in the first plurality of points of interest;

generating a first-tier user-specific offline-map-data collection comprising first-tier information for each point of interest in the sixth plurality of points of interest; and communicating the first-tier user-specific offline-map-data collection to the user device.

6. The media of claim 1, wherein the first-tier information for a given point of interest comprises data needed to locate the given point of interest on a digital map presented to the user and data needed to determine a relevance of the point of interest to a user query, wherein the second-tier information for the given point of interest includes detailed information about the point of interest not included in the first-tier information, and wherein the third-tier information for the given point of interest includes a third-party review of the given point of interest.

7. The media of claim 6, wherein the second-tier information comprises a food menu provided by the given point of interest.

8. A method of storing point of interest data for offline consumption, the method comprising:

receiving, at a user device, a first-tier general offline-map-data collection comprising first-tier information for points of interest in a first plurality of points of interest with above a low threshold of digital interaction within digital interaction data;

receiving, at the user device, a second-tier general offline-map-data collection comprising second-tier information for points of interest in a second plurality of points of interest with above a medium threshold of digital interaction within the digital interaction data, wherein the medium threshold is different from the low threshold amount;

receiving, at the user device, a third-tier general offline-map-data collection comprising third-tier information for points of interest in a third plurality of points of interest with above a high threshold of digital interaction within the digital interaction data, wherein the high threshold is different from the medium threshold and the low threshold, and wherein an individual point of interest with above the high threshold of digital interaction is also above the medium threshold and the low threshold;

receiving, at the user device, a third-tier user-specific offline-map-data collection comprising third-tier information for each point of interest in a fourth plurality of points of interest with above a user-specific high threshold of digital interaction within the digital interaction data from a first plurality of users, wherein the first plurality of users fit a profile associated with a user, wherein the fourth plurality of points of interest includes a point of interest not included in the third plurality of points of interest;

receiving, at the user device, a second-tier user-specific offline-map-data collection comprising second-tier information for each point of interest in a fifth plurality of points of interest with above a user-specific medium threshold of digital interaction within the digital interaction data from a second plurality of users, wherein the second plurality of users fit a profile associated with the user, wherein the fifth plurality of points of interest includes a point of interest not included in the second plurality of points of interest;

receiving, at the user device, a first-tier user-specific offline-map-data collection comprising first-tier information for each point of interest in a sixth plurality of points of interest with above a user-specific low threshold of digital interaction within the digital interaction data from a third plurality of users, wherein the third plurality of users fit a profile associated with the user, wherein the sixth plurality of points of interest includes a point of interest not included in the first plurality of points of interest;

receiving, at the user device when the user device is not connected to a network, a query;

using the first-tier user-specific offline-map-data to generate a search result for a point of interest that is responsive to the query; and outputting for display a search result page comprising a map with the point of interest indicated on the map and the search result.

9. The method of claim 8, wherein the method further comprises:

receiving a selection of the search result;

using the second-tier user-specific offline-map-data to generate a detail page for the point of interest; and outputting for display the detail page comprising details about the point of interest that were not shown in the search result.

10. The method of claim 9, wherein the details comprise a price for tickets to an event at the point of interest.

11. The method of claim 8, wherein the method further comprises:

receiving a selection of the search result;

using the third-tier user-specific offline-map-data to generate a third-party rating page for the point of interest; and outputting for display the third-party rating page comprising feedback about the point of interest provided by third parties.

12. The method of claim 11, wherein the feedback is an aggregate rating generated by averaging ratings provided by a plurality of customers.

13. The method of claim 8, wherein the first-tier user-specific offline-map-data, the second-tier user-specific offline-map-data, and the third-tier user-specific offline-map-data are all associated with a geographic area, and wherein the user device is also associated with the geographic area.

14. The method of claim 8, wherein the method further comprises communicating an amount of computer storage available on a user device allocated for storage of offline point of interest data.

15. The method of claim 8, wherein the first-tier information for a given point of interest comprises data needed to locate the given point of interest on a digital map presented to the user and data needed to determine a relevance of the point of interest to a user query, wherein the second-tier information for the given point of interest includes detailed information about the point of interest not included in the first-tier information, and wherein the third-tier information for the given point of interest includes a third-party review of the given point of interest.

16. A method of storing point of interest data for offline consumption, comprising:

receiving digital interaction data for points of interest located in a geographic region, the digital interaction data describing interactions of people with the points of interest;

identifying a first plurality of points of interest with above a low threshold of digital interaction within the digital interaction data;

generating a first-tier general offline-map-data collection comprising first-tier information for points of interest in the first plurality of points of interest;

identifying a sixth plurality of points of interest with above a user-specific low threshold of digital interaction within the digital interaction data from a first plurality of users, wherein the first plurality of users fit a profile associated with a user, wherein the sixth plurality of points of interest includes a point of interest not included in the first plurality of points of interest;

generating a first-tier user-specific offline-map-data collection comprising first-tier information for each point of interest in the sixth plurality of points of interest; and communicating the first-tier general offline-map-data collection and the first-tier user-specific offline-map-data collection to a user device associated with a user with a geographic profile that includes the geographic region.

17. The method of claim 16, further comprising:

identifying a second plurality of points of interest with above a medium threshold of digital interaction within the digital interaction data, wherein the medium threshold amount is different from the low threshold amount;

generating a second-tier general offline-map-data collection comprising second-tier information for points of interest in the second plurality of points of interest;

identifying a fifth plurality of points of interest with above a user-specific medium threshold of digital interaction within the digital interaction data from a second plurality of users, wherein the second plurality of users fit a profile associated with the user, wherein the fifth plurality of points of interest includes a point of interest not included in the second plurality of points of interest;

generating a second-tier user-specific offline-map-data collection comprising second-tier information for each point of interest in the fifth plurality of points of interest; and communicating the second-tier general offline-map-data collection and the second-tier user-specific offline-map-data collection to the user device.

18. The method of claim 16, further comprising:

identifying a third plurality of points of interest with above a high threshold amount of digital interaction within the digital interaction data, wherein the high threshold is different from the medium threshold amount, and wherein an individual point of interest with above the high threshold of digital interaction is also above the medium threshold and the low threshold;

generating a third-tier general offline-map-data collection comprising third-tier information for points of interest in the third plurality of points of interest; and communicating the third-tier general offline-map-data collection to the user device.

19. The method of claim 16, wherein the method further comprises storing the digital interaction data and calculating the low threshold amount based on memory allocated to offline point of interest data storage, wherein the threshold increases as available memory decreases.

20. The method of claim 16, wherein the digital interaction data comprises location data received from a plurality of user devices.

* * * * *